July 13, 1937.  G. M. McGUCKIN  2,087,159
GAME PIECE
Filed April 30, 1935   2 Sheets-Sheet 1

Inventor
G. M. McGuckin
By Clarence A. O'Brien
Attorney

July 13, 1937.　　　G. M. McGUCKIN　　　2,087,159
GAME PIECE
Filed April 30, 1935　　　2 Sheets-Sheet 2

Inventor
G. M. McGuckin
By Clarence A. O'Brien
Attorney

Patented July 13, 1937

2,087,159

UNITED STATES PATENT OFFICE 2,087,159

GAME PIECE

Glenn M. McGuckin, Chandler, Okla.

Application April 30, 1935, Serial No. 19,120

1 Claim. (Cl. 273—137)

The present invention relates to new and useful improvements in game pieces particularly for playing dominoes, anagrams, and other games which, when played, require pieces which must be inverted or turned face down.

The primary object of the present invention is to provide, in a manner as hereinafter set forth, a game piece of the aforementioned character embodying a novel construction which is such that a large number of the pieces may be easily and rapidly turned face down or inverted preparatory to playing, thus eliminating the tedious task of inverting the pieces one at a time as at present.

Other objects of the invention are to provide a game piece of the character described which will be comparatively simple in construction, strong, durable, compact, attractive in appearance and which may be manufactured at low cost.

All of the foregoing and still further objects and advantages of the invention will become apparent from a study of the following specification, taken in connection with the accompanying drawings wherein like characters of reference designate corresponding parts throughout the several views, and wherein:—

Figure 1:
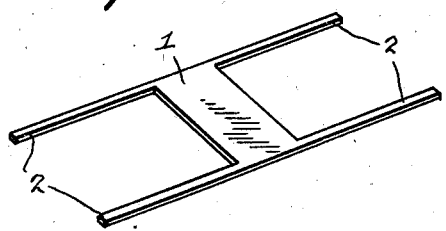
Figure 1 is a perspective view of the blank from which an embodiment of the present invention is formed.
Figure 2:
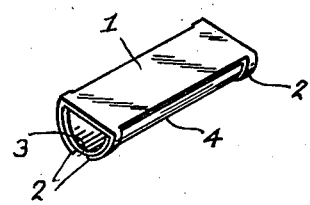
Figure 2 is a perspective view of that form of the invention which includes the blank shown in Figure 1.
Figure 3:
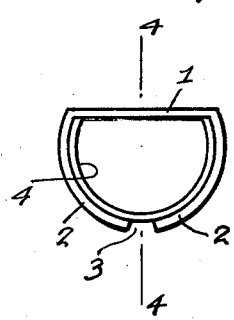
Figure 3 is a view in end elevation of the form of the invention shown in Figure 2.
Figure 4:
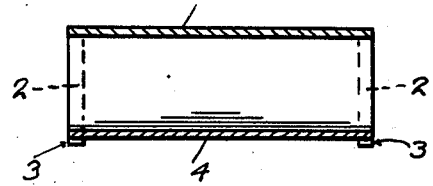
Figure 4 is a view in vertical longitudinal section, taken substantially on the line 4—4 of Figure 3.
Figure 5:
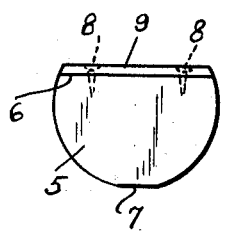
Figure 5 is a view in end elevation of another form of the invention.
Figure 7:
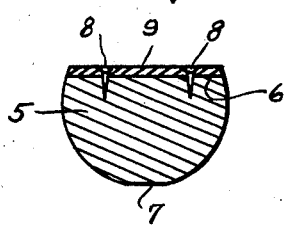
Figure 7 is a view in vertical transverse section, taken substantially on the line 7—7 of Figure 6.
Figure 6:
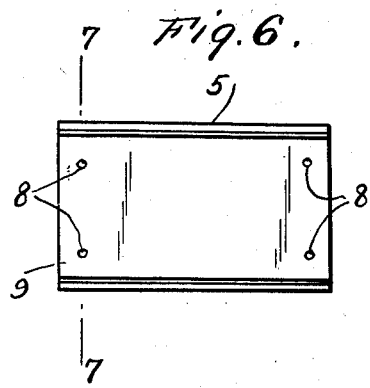
Figure 6 is a view in top plan of the Figure 5 modification.
Figure 8:
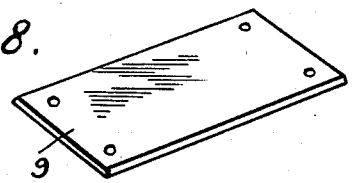
Figure 8 is a detail view in perspective of the combined face plate and weight constituting a part of the Figure 5 modification.

Referring to the drawings in detail, and to Figures 1 to 4, inclusive, thereof in particular, it will be seen that the reference numeral 1 designates a plate of suitable metal having formed integrally therewith pairs of arms which are curved downwardly and inwardly in a manner to provide what will be hereinafter referred to as rockers 2 which terminate in spaced relation to each other, as illustrated to advantage in Figure 3 of the drawings. It will thus be seen that a comparatively narrow longitudinal base 3 is provided on which the piece rests when in a face up position.

Mounted in the rockers 2 is a sheet 4 of suitable light flexible material, preferably cardboard, the longitudinal edges of which abut the lower or inner side of the plate 1, said sheet bridging the gap between the free ends of the rockers 2. Any desired characters, such as numbers, letters or spots may be provided on the plate 1.

In using the game piece thus far described, said piece, when in an upright position, rests on the comparatively narrow base 3, as hereinbefore stated. Of course, a plurality of the pieces are used in the playing of the game. When it is desired to invert all of the pieces or, in other words, turn them face down, it is only necessary to move or shuffle said pieces on the playing surface sufficiently to overbalance said pieces on the comparatively narrow bases 3 after which the plates 1, functioning as weights, will cause the pieces to roll by gravity on the rockers 2 to an inverted or face down position. During the just described shuffling operation, the sheets 4 act as shields for preventing the rockers 2 from becoming entangled. Stated another way, it is only necessary to give the pieces, when in an upright position, a slight initial movement to cause them to roll by gravity to an inverted position.

Referring now to Figures 5 to 8, inclusive, of the drawings, it will be seen that the reference numeral 5 designates a body of substantially segmental cross-section which is preferably of wood. The body 5 includes a face 6 and a comparatively narrow flat base portion 7. Secured in any suitable manner, as at 8, on the face 6 of the body 5 is a combined face plate and weight 9 upon which the desired characters are placed.

The form of the invention shown in Figures 5 to 8, inclusive, is used in a manner similar to that set forth for the previously described form of the invention. If desired, the ends of the body 5 may be rounded or otherwise formed to cause the pieces to be deflected should they collide end to end with each other during the shuffling operation. Further, the body 5 may be of any desired length and the face 6 thereof may be of any desired shape or outline in plan.

Figure 9:
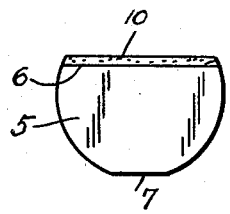
Figure 9 is a view in end elevation of another form of the invention.
Figure 10:
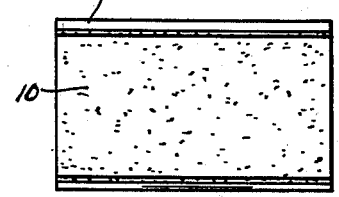
Figure 10 is a top plan view of the Figure 9 modification.

In Figures 9 and 10 of the drawings, the body 5 is provided, on its face 6 and in lieu of the plate 9, with a thick coating of heavy paint 10, such as paint having a high lead content. Or, if desired, the coating 10 may be applied in the form of molten metal. Of course, the desired characters are placed on the coating 10.

Figure 11:
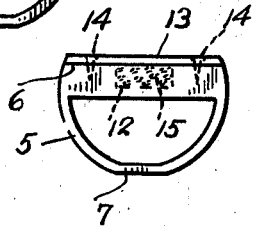
Figure 11 is a view in end elevation of still another form of the invention.
Figure 12:
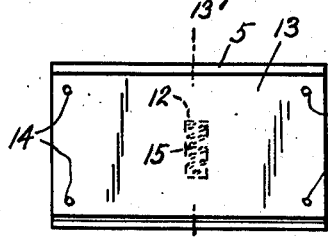
Figure 12 is a view in top plan of the Figure 11 modification.
Figure 13:
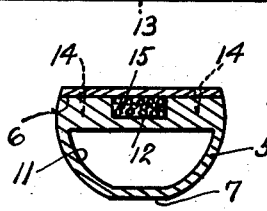
Figure 13 is a view in vertical transverse section, taken substantially on the line 13—13 of Figure 12.

Referring to Figures 11, 12 and 13 of the drawings, it will be seen that the lower portion of the body 5 is hollow, as at 11. Then, the face 6 of the body 5 has formed therein a chamber or well 12 which is covered by a face plate 13, said face plate being secured in position by suitable means, as at 14. The chamber or well 12 is for the reception of shot 15 which, as will be apparent, constitutes a weight for causing the piece to roll by gravity to inverted position when tilted off the base 7.

Figure 15:
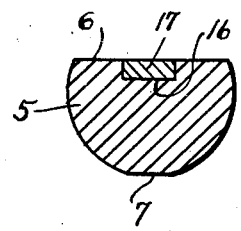
Figure 15 is a view in vertical transverse section, taken substantially on the line 15—15 of Figure 14.
Figure 14:
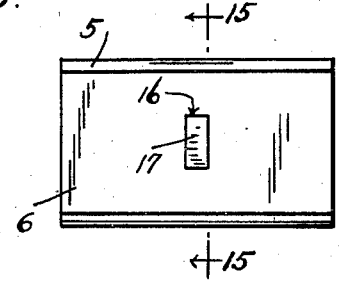
Figure 14 is a top plan view of still another form of the invention.

In the modification illustrated in Figures 14 and 15 of the drawings, the face 6 of the body 5 has formed therein a pocket or well 16 in which a weight 17 is fixed. It will be noted that the weight 17 is in one piece. In this form of the invention the characters are applied directly to the face 6.

Figure 16:
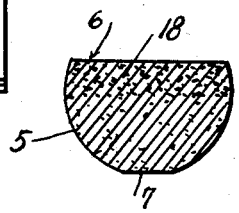
Figure 16 is a view in vertical transverse section of another modification.
Figure 17:
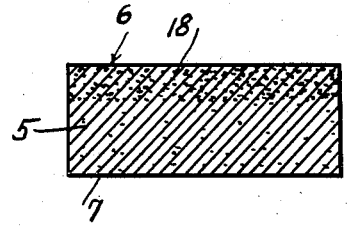
Figure 17 is a view in vertical longitudinal section through that form of the invention shown in Figure 16.

In Figures 16 and 17 of the drawings, the body 5 is of composition material the density of which increases toward the face 6, as at 18, to provide the necessary top heaviness for causing the piece to roll by gravity to an inverted position when tilted off the base 7. In this form of the invention the characters are also applied directly to the face 6.

Figure 18:
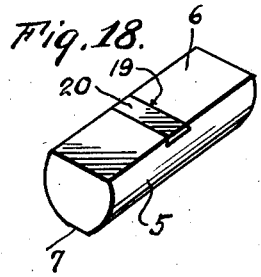
Figures 18 and 19 are perspective views of additional modifications.

Referring now to Figure 18 of the drawings, it will be seen that the face 6 of the body 5 has formed transversely therein a dovetail groove 19 for the reception of a correspondingly shaped weight 20. The weight 20 may be of any suitable material, preferably lead, and said weight may be secured in the groove or channel 19 in any suitable manner.

Figure 19:
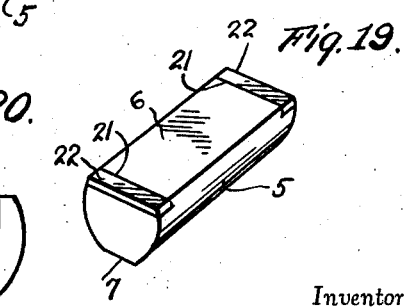

In Figure 19 of the drawings, the end portions of the face 6 of the body 5 are rabbeted, as at 21, for the reception of weights 22. The weights 22 are also of any suitable material, such as lead and they may be secured in position by any suitable means.

Figure 20:
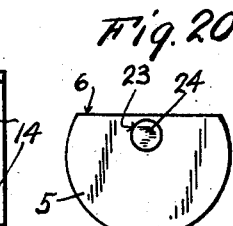

In the Figure 20 modification the body 5 has formed longitudinally therein, adjacent the face 6, a bore or chamber 23 for the reception of a cylindrical weight 24 which may be fixed in position in any suitable manner.

Figure 21:
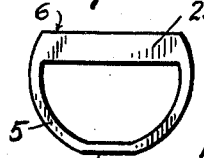
Figures 20, 21 and 22 are end elevational views of still further modifications.

In the form of the invention shown in Figure 21 of the drawings, the entire device is molded from suitable metal and the body 5 is hollow and provided with a flat, thickened upper portion 25 providing the face 6 upon which the characters are placed. Of course, the portion 25 constitutes the weight which causes the piece to roll by gravity to inverted position when tilted off the base 7.

Figure 22:

In the form of the invention illustrated by Figure 22 of the drawings, the body 5 is of suitable light material, such as wood, having secured thereon a face piece 26 of comparatively heavy material, such as lead or any other suitable metal in which the characters are molded. The portion 26 may be secured to the body 5 by any suitable means, such as through the medium of an adhesive.

It is believed that the many advantages of a game piece constructed in accordance with the present invention will be readily understood, and although preferred embodiments of the invention are as illustrated and described, it is to be understood that further modifications are contemplated which will fall within the scope of the invention as claimed.

What is claimed is:—

A game piece comprising a body of substantially segmental cross-section, having a substantially flat upper surface and further having a substantially flat lower surface for supporting the body in an upright position, said body being of composition material, the density of said material increasing toward the upper surface for weighting the upper portion of the body.

GLENN M. McGUCKIN.